(12) United States Patent
Kato

(10) Patent No.: US 9,515,926 B2
(45) Date of Patent: Dec. 6, 2016

(54) COMMUNICATION SYSTEM, UPPER LAYER SWITCH, CONTROL APPARATUS, SWITCH CONTROL METHOD, AND PROGRAM

(71) Applicant: NEC CORPORATION, Tokyo (JP)

(72) Inventor: Takeshi Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 61 days.

(21) Appl. No.: 14/388,206

(22) PCT Filed: Mar. 27, 2013

(86) PCT No.: PCT/JP2013/059008
§ 371 (c)(1),
(2) Date: Sep. 25, 2014

(87) PCT Pub. No.: WO2013/146885
PCT Pub. Date: Oct. 3, 2013

(65) Prior Publication Data
US 2015/0043588 A1    Feb. 12, 2015

(30) Foreign Application Priority Data

Mar. 28, 2012  (JP) .................................. 2012-074654

(51) Int. Cl.
*H04L 12/28* (2006.01)
*H04L 12/741* (2013.01)
(Continued)

(52) U.S. Cl.
CPC ............ *H04L 45/74* (2013.01); *H04L 45/306* (2013.01); *H04L 45/64* (2013.01); *H04L 69/22* (2013.01); *H04L 47/19* (2013.01)

(58) Field of Classification Search
None
See application file for complete search history.

(56) References Cited

U.S. PATENT DOCUMENTS 7,616,563 B1\* 11/2009 Eiriksson ............... H04L 45/00
370/230
2002/0085488 A1    7/2002 Kobayashi
(Continued)

FOREIGN PATENT DOCUMENTS

| CN | 102369703 A  | 3/2012 |
| JP | 2002-261792 A | 9/2002 |

(Continued)

OTHER PUBLICATIONS

International Search Report (ISR) (PCT Form PCT/ISA/210), in PCT/JP2013/059008, dated Jul. 2, 2013.
(Continued)

*Primary Examiner* — Chi H Pham
*Assistant Examiner* — Fahmida Chowdhury
(74) *Attorney, Agent, or Firm* — Sughrue Mion, PLLC

(57) ABSTRACT

A communication system includes: a core network including a lower layer switch that holds control information associating match condition(s) including lower layer header information, and processing content, and processes a received packet using control information having a match condition that matches the received packet; an upper layer switch, disposed at an edge of the core network, which rewrites a prescribed region of a header of a lower layer of a packet with content associated with communication content of an upper layer; and a control apparatus that instructs the upper layer switch to rewrite the header region of the lower layer, and also sets control information including, in a match condition, header information after the rewriting, in the lower layer switch.

15 Claims, 14 Drawing Sheets

(51) Int. Cl.
*H04L 12/715* (2013.01)
*H04L 29/06* (2006.01)
*H04L 12/725* (2013.01)
*H04L 12/801* (2013.01)

(56) References Cited

U.S. PATENT DOCUMENTS

| | | |
|---|---|---|
| 2006/0133371 A1 | 6/2006 | Matoba |
| 2006/0165053 A1 | 7/2006 | Bhatnagar et al. |
| 2011/0286324 A1* | 11/2011 | Bellagamba ........ H04L 41/0677 370/219 |
| 2012/0011264 A1 | 1/2012 | Izawa |
| 2012/0263186 A1 | 10/2012 | Ueno |
| 2013/0042317 A1 | 2/2013 | Nakashima |

FOREIGN PATENT DOCUMENTS

| | | |
|---|---|---|
| JP | 2004-228791 A | 8/2004 |
| JP | 2005-109536 A | 4/2005 |
| JP | 2006-174374 A | 6/2006 |
| JP | 2006-203904 A | 8/2006 |
| JP | 2012-186649 A | 9/2012 |
| WO | WO 2008/095010 A1 | 8/2008 |
| WO | WO 2011/037105 A1 | 3/2011 |
| WO | 2011/093228 A1 | 8/2011 |

OTHER PUBLICATIONS

Nick McKeown and seven other authors, "OpenFlow: Enabling Innovation in Campus Networks", [online], [search conducted on Feb. 14, 2012], Internet: <URL: http://www.openflow.org/documents/openflow-wp-latest.pdf>.

"OpenFlow Switch Specification" Version 1.1.0 Implemented (Wire Protocol 0x02) Feb. 14, 2012, [online], [search conducted Feb. 14, 2012], Internet: <URL: http://www.openflow.org/documents/openflow-spec-v1.1.0.pdf>.

"OpenFlow Switch Specification" Version 1.2 (Wire Protocol 0x03). Dec. 5, 2011, XP055073743, Retrieved from the Internet: URL: https://www.opennetworking.org/images/stories/downloads/sdn-resources/onf-specifications/openflow/openflow-spec-v1.2.pdf [retrieved on Jul. 31, 2013].

Communication dated Jul. 4, 2016, from the State Intellectual Property Office of People's Republic of China in counterpart Application No. 201380017101.3.

* cited by examiner

FIG. 4

| APPLICATION | SELECTED PATH | PATH SELECTION KEY | L4 PORT NUMBER SEEN FROM NODE 12 |
|---|---|---|---|
| | | | L4 PORT NUMBER RANGE 60 |
| APPLICATION A | PATH 51 | L4 PORT NUMBER RANGE 61 | |
| APPLICATION B | PATH 52 | L4 PORT NUMBER RANGE 62 | |

FIG. 5

| NODE / L4 PORT NUMBER | | | NODE / L4 PORT NUMBER | | RUNNING APPLICATION |
|---|---|---|---|---|---|
| NODE 11 L4 PORT NUMBER X | L4 CONVERSION FOR PATH SELECTION | WHEN APPLICATION A IS RUN | L4 PORT NUMBER 61-1 | NODE 12 L4 PORT NUMBER Y | L4 CONVERSION FOR PATH SELECTION | APPLICATION A |
| | | WHEN APPLICATION B IS RUN | L4 PORT NUMBER 62-1 | | NO CONVERSION | |

FIG. 6

| NODE / L4 PORT NUMBER | | | NODE / L4 PORT NUMBER | | RUNNING APPLICATION |
|---|---|---|---|---|---|
| NODE 11 L4 PORT NUMBER 60-1 | L4 CONVERSION FOR PATH SELECTION | | NODE 12 L4 PORT NUMBER Y | L4 CONVERSION FOR PATH SELECTION | APPLICATION A |
| | WHEN APPLICATION A IS RUN | L4 PORT NUMBER 61-1 | | NO CONVERSION | |
| | WHEN APPLICATION B IS RUN | L4 PORT NUMBER 62-1 | | | |

FIG. 7

| NODE 11 L4 PORT NUMBER | NODE / L4 PORT NUMBER | | NODE / L4 PORT NUMBER | | RUNNING APPLICATION |
|---|---|---|---|---|---|
| | L4 CONVERSION FOR PATH SELECTION | | | | |
| NODE 11 L4 PORT NUMBER X | WHEN APPLICATION A IS RUN | L4 PORT NUMBER 61-1 | NODE 12 L4 PORT NUMBER Y | L4 CONVERSION FOR PATH SELECTION | APPLICATION B |
| | WHEN APPLICATION B IS RUN | L4 PORT NUMBER 62-1 | | NO CONVERSION | |

FIG. 8

| NODE 11 L4 PORT NUMBER 60-1 | NODE / L4 PORT NUMBER | | | NODE / L4 PORT NUMBER | RUNNING APPLICATION |
|---|---|---|---|---|---|
| | L4 CONVERSION FOR PATH SELECTION | | | L4 CONVERSION FOR PATH SELECTION | |
| | WHEN APPLICATION A IS RUN | L4 PORT NUMBER 61-1 | | NODE 12 L4 PORT NUMBER Y | NO CONVERSION | APPLICATION B |
| | WHEN APPLICATION B IS RUN | L4 PORT NUMBER 62-1 | | | |

FIG. 9

| | MATCH CONDITION (MATCH FIELDS) | | | | ACTION | |
|---|---|---|---|---|---|---|
| | L3 SOURCE ADDRESS | L4 SOURCE PORT RANGE | L3 DESTINATION ADDRESS | L4 DESTINATION PORT RANGE | FORWARDING DIRECTION | |
| ENTRY 711 | NODE 11 | L4 PORT NUMBER RANGE 61 | NODE 12 | ANY | L4 SWITCH 22 SIDE | |
| ENTRY 712 | NODE 11 | L4 PORT NUMBER RANGE 62 | NODE 12 | ANY | L4 SWITCH 23 SIDE | |
| ENTRY 713 | NODE 12 | ANY | NODE 11 | L4 PORT NUMBER RANGE 61 | L7 SWITCH 41 SIDE | |
| ENTRY 714 | NODE 12 | ANY | NODE 11 | L4 PORT NUMBER RANGE 62 | L7 SWITCH 41 SIDE | |

COMMUNICATION SYSTEM, UPPER LAYER SWITCH, CONTROL APPARATUS, SWITCH CONTROL METHOD, AND PROGRAM

TECHNICAL FIELD

Reference to Related Application

This application is based upon and claims the benefit of the priority of Japanese Patent Application No. 2012-074654 filed on Mar. 28, 2012, the disclosure of which is incorporated herein in its entirety by reference thereto.

The present invention relates to a communication system, an upper layer switch, a control apparatus, a switch control method, and a program; and in particular relates to a communication system that includes a switch that operates in accordance with control information set by a control apparatus, an upper layer switch, a control apparatus, a switch control method, and a program.

BACKGROUND

In recent years, technology known as OpenFlow has been proposed (refer to Patent Literature 1, and Non-Patent Literature 1 and 2). In OpenFlow communication is taken as end-to-end flow, and path control, failure recovery, load balancing, and optimization are performed on a per-flow basis. An OpenFlow switch functioning as a relay device is provided with a secure channel for communication with an OpenFlow controller positioned as a control apparatus, and operates according to a flow table in which appropriate addition or rewriting is instructed by the OpenFlow controller. In the flow table, for each flow there are definitions of sets of matching rules (Header Fields) for collation with packet headers, flow statistical information (Counters), and Instructions that define processing content to be applied to packets matching a matching rule (Header Fields) (refer to "4.1 Flow Table" and following, in Non Patent Literature 2).

For example, when an OpenFlow switch receives a packet, a search is made for an entry that has a matching rule that matches header information of the received packet, from the flow table. As a result of the search, in a case where an entry matching the received packet is found, the OpenFlow switch updates the flow statistical information (Counters) and also implements processing content (packet transmission from a specified port, flooding, dropping, and the like) described in an Actions field of the entry in question, for the received packet. On the other hand, as a result of the search, in a case where an entry matching the received packet is not found, the OpenFlow switch forwards the received packet to the OpenFlow controller via a secure channel, requests determination of a path of the packet based on source and destination of the received packet, receives a flow entry realizing this, and updates the flow table. In this way, the OpenFlow switch uses the entry stored in the flow table as a processing rule to perform packet forwarding.

Patent Literature 2 discloses a method of analyzing content at a network entrance, attaching a label to a packet, and thereafter selecting a path by a label base.
[Patent Literature 1]
PCT International Publication No. 2008/095010
[Patent Literature 2]
Japanese Patent Kokai Publication No. JP2006-203904A
[Non-Patent Literature 1]
Nick McKeown and seven other authors, "OpenFlow: Enabling Innovation in Campus Networks", [online], [search conducted on Feb. 14, 2012], Internet: <URL: http://www.openflow.org/documents/openflow-wp-latest.pdf>
[Non-Patent Literature 2]
"OpenFlow Switch Specification" Version 1.1.0 Implemented (Wire Protocol 0x02) Feb. 14, 2012, [online], [search conducted on Feb. 14, 2012], Internet: <URL: http://www.openflow.org/documents/openflow-spec-v1.1.0.pdf >

SUMMARY

The following analysis is given according to the present invention. In OpenFlow in the abovementioned Non Patent Literature 1 and 2, control of flow is performed based on layer information of layer 4 (denoted below as "L4") or lower, such as MAC (Media Access Control) address and IP address/port number, with regard to Ethernet (registered trademark) and TCP (Transmission Control Protocol)/IP (Internet Protocol) networks. Note that in the present specification, L4 and lower are referred to as "lower layer", and L5 and above are referred to as "upper layer". When flow control is performed, as represented by an OpenFlow switch, a switch that operates by referring to information of L4 or lower is referred to as a "lower layer switch" and a switch that operates by referring to an "upper layer" is referred to as an "upper layer switch".

However, in a system in which various applications operate based on the same IP address/port number, with flow control in L4 and lower, there is a problem in that it is not possible to perform flow control corresponding to upper layer information, for example, application type (refer to the OpenFlow Protocol in Non Patent Literature 2).

On the other hand, apparatuses are known that provide substitute responses, recognizing applications such as a firewall, a proxy server or the like, or rewriting packet headers, but these apparatuses cannot control network paths.

In a method according to Patent Literature 2, due to the introduction of a packet format outside of TCP/IP, types of apparatus configuring a network are limited.

It is an object of the present invention to provide a communication system, an upper layer switch, a control apparatus, a switch control method, and a program, that can contribute to realizing, in a lower layer switch, detailed forwarding control taking into account upper layer information.

According to a first aspect, there is provided a communication system including: a core network that includes a lower layer switch that holds control information associating match condition(s) including lower layer header information, and processing content, and processes a received packet using control information having a match condition that matches the received packet; an upper layer switch, disposed at an edge of the core network, which rewrites a prescribed region of a header of a lower layer of a packet with content associated with communication content of an upper layer, based on header information of the upper layer; and a control apparatus that instructs the upper layer switch to rewrite the header region of the lower layer, and also sets control information including, in a match condition, header information after the rewriting, in the lower layer switch.

According to a second aspect, there is provided an upper layer switch, disposed at an edge of a core network that includes a lower layer switch that holds control information associating match condition(s) including lower layer header information, and processing content, and processes a received packet using control information having a match condition that matches the received packet, wherein the upper layer switch rewrites a prescribed region of a header of a lower layer of a packet with content associated with communication content of an upper layer, based on header information of the upper layer, based on an instruction from a prescribed control apparatus.

According to a third aspect, there is provided a control apparatus connected to a core network that includes a lower layer switch that holds control information associating match condition(s) including lower layer header information, and processing content, and processes a received packet using control information having a match condition that matches the received packet; and an upper layer switch, disposed at an edge of the core network, which rewrites a prescribed region of a header of a lower layer of a packet with content associated with communication content of an upper layer, based on header information of the upper layer; wherein the control apparatus instructs the upper layer switch to rewrite the header region of the lower layer, and also sets control information including, in a match condition, header information after the rewriting, in the lower layer switch.

According to a fourth aspect, there is provided a switch control method for a network including: a core network that includes a lower layer switch that holds control information associating match condition(s) including lower layer header information, and processing content, and processes a received packet using control information having a match condition that matches the received packet; and an upper layer switch, disposed at an edge of the core network, which rewrites a prescribed region of a header of a lower layer of a packet with content associated with communication content of an upper layer, based on header information of the upper layer; the method comprising: instructing the upper layer switch to rewrite the header region of the lower layer, and setting control information including, in a match condition, header information after the rewriting, in the lower layer switch. The present method is tied to a specific apparatus, being an apparatus that controls the abovementioned upper layer switch and the lower layer switch.

According to a fifth aspect, there is provided a program adapted to execute a computer connected to a network that includes: a core network that includes a lower layer switch that holds control information associating match condition (s) including lower layer header information, and processing content, and processes a received packet using control information having a match condition that matches the received packet; and an upper layer switch, disposed at an edge of the core network, which rewrites a prescribed region of a header of a lower layer of a packet with content associated with communication content of an upper layer, based on header information of the upper layer: the program executing a process of instructing the upper layer switch to rewrite the header region of the lower layer, and a process of setting control information including, in a match condition, header information after the rewriting, in the lower layer switch. It is to be noted that this program can be recorded on a computer-readable (non-transient) storage medium. That is, the present invention can be embodied as a computer program product.

The meritorious effects of the present invention are summarized as follows.

According to the present disclosure, it is possible to contribute to realizing detailed forwarding control that takes into account upper layer information, by a lower layer switch.

BRIEF DESCRIPTION OF DRAWINGS

FIG. 4 is an example of a path management table held by the controller in the first exemplary embodiment of the disclosure.

FIG. 5 is an example of a header conversion table (with application A running) held by an L7SW 41 in the first exemplary embodiment of the disclosure.

FIG. 6 is an example of a header conversion table (with application A running) held by an L7SW 42 in the first exemplary embodiment of the disclosure.

FIG. 7 is an example of a header conversion table (with application B running) held by the L7SW 41 in the first exemplary embodiment of the disclosure.

FIG. 8 is an example of a header conversion table (with application B running) held by the L7SW 42 in the first exemplary embodiment of the disclosure.

FIG. 9 is an example of a flow entry set in an L4SW in the first exemplary embodiment of the disclosure.

PREFERRED MODES

Figure 1:
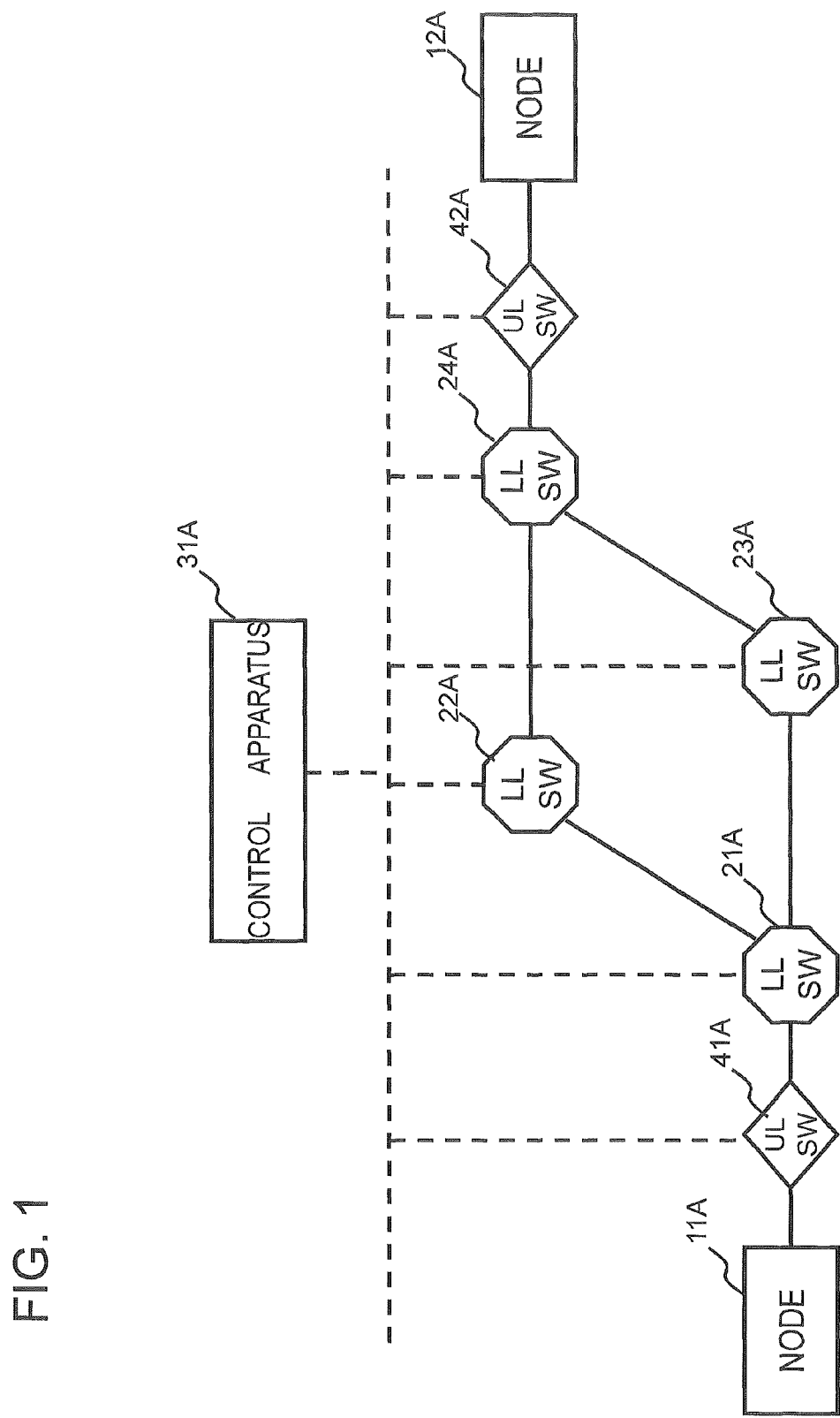
FIG. 1 is a diagram showing a configuration of an exemplary embodiment of the disclosure.

First, a description is given of an outline of an exemplary embodiment of the present disclosure, making reference to the drawings. It is to be noted that reference symbols in the drawings attached to the present outline are added for convenience to respective elements as an example for aiding understanding, and are not intended to limit the present disclosure to modes shown in the drawings.

The present disclosure, in an exemplary embodiment thereof as shown in FIG. 1, can be realized by a configuration including: a core network including lower layer switches (LLSW 21A to 24A in FIG. 1) that performs packet forwarding based on lower layer information, upper layer switches (ULSW 41A and 42A in FIG. 1) disposed at edges of the core network, and a control apparatus (31A in FIG. 1) that controls the lower layer switches (LLSW 21A to 24A In FIG. 1) and the upper layer switches (ULSW 41A and 42A in FIG. 1).

More specifically, the lower layer switches (LLSW 21A to 24A In FIG. 1) hold control information associating match conditions including lower layer header information, and processing content, and perform forwarding of received packets using control information holding match conditions that match the received packets. The upper layer switches (ULSW 41A and 42A in FIG. 1) rewrite a prescribed region of a lower layer header of a packet, based on upper layer header information, with content associated with communication content of an upper layer. Furthermore the control apparatus (31A in FIG. 1) instructs the upper layer switch (es) to rewrite the lower layer header region, and also sets control information including header information after the rewriting to the lower layer switch, in match conditions.

For example, the control apparatus (31A in FIG. 1) instructs an upper layer switch (ULSW 41A, 42A in FIG. 1) to embed an identifier indicating application type in a prescribed region of a header of a lower layer of a packet, based on the application type understood from the upper layer header information. Furthermore, by setting control information including the identifier in a match condition, in the lower layer switches (LLSW 21A to 24A In FIG. 1), the control apparatus (31A in FIG. 1) realizes path control in accordance with application type.

It is to be noted that in the example of FIG. 1, the upper layer switches (ULSW 41A and 42A in FIG. 1) are connected directly to external nodes (nodes 11A and 12A in FIG. 1), but a lower layer switch or the like may also be disposed between the external nodes (nodes 11A and 12A in FIG. 1) and the upper layer switches (ULSW 41A, 42A in FIG. 1). In the example of FIG. 1, two upper layer switches (ULSW 41A and 42A in FIG. 1) are disposed, but 1 of the upper layer switches (ULSW 41A and 42A in FIG. 1) or 3 or more switches may also be disposed, as described later in second and third exemplary embodiments.

[First Exemplary Embodiment]

Figure 2:
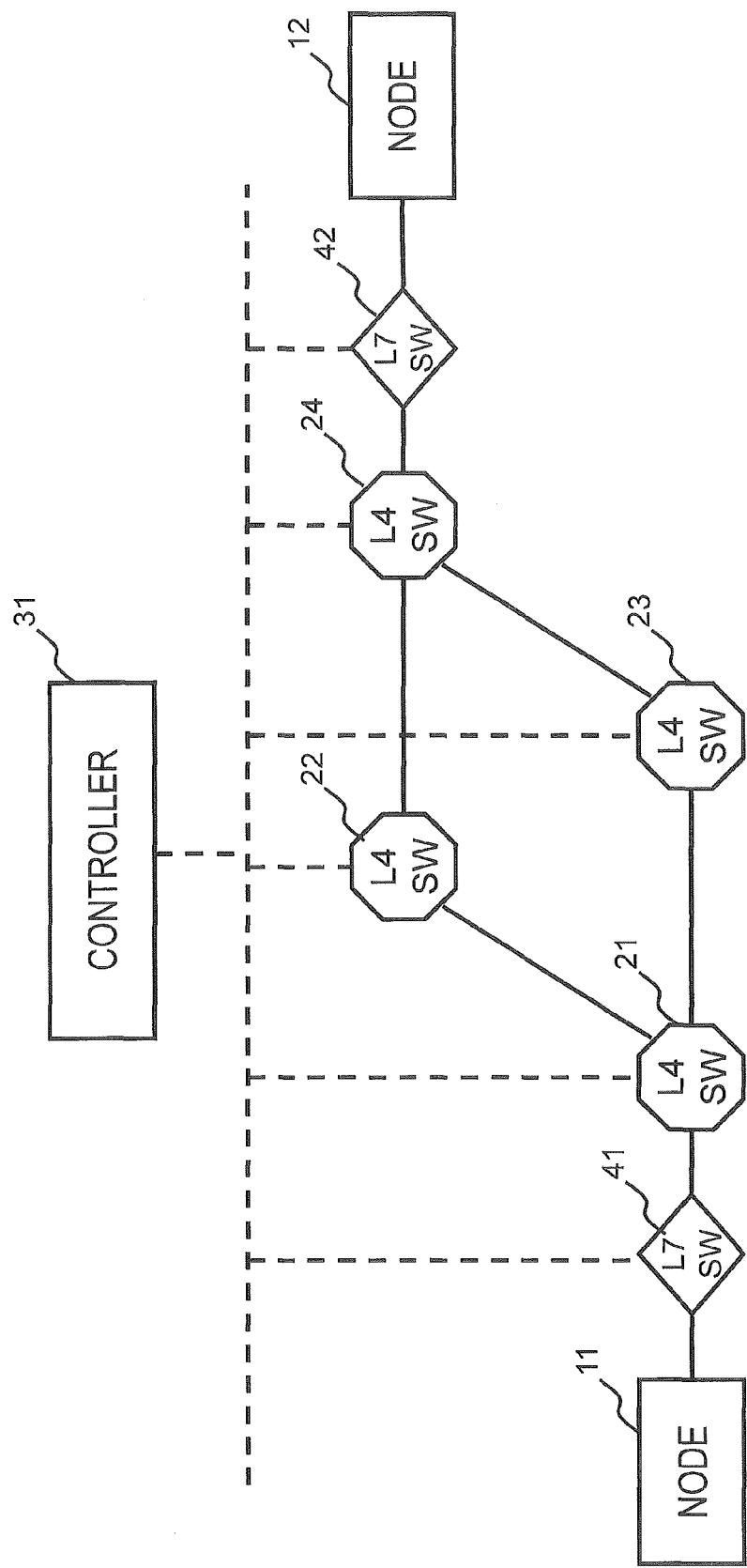
FIG. 2 is a diagram showing a configuration of a communication system of a first exemplary embodiment of the present disclosure.

Next, a detailed description is given concerning a first exemplary embodiment, making reference to the drawings. FIG. 2 is a diagram showing a configuration of a communication system according to the first exemplary embodiment of the present disclosure.

Referring to FIG. 2, a configuration is shown that includes: layer 4 switches (referred to below as "L4SW(s)") 21 to 24 that process packets in accordance with a flow entry set by a controller 31, layer 7 switches (referred to below as "L7SW(s)") 41 and 42 that are disposed at two ends (entry and exit) of the L4SWs 21 to 24, and a controller 31 that controls the L4SW and the L7SW. It is to be noted that in FIG. 2, a solid line indicates a connection relationship with a network that transmits data between nodes 11 and 12, and a broken line represents a control channel between the controller 31 and the L4SW and L7SW.

Nodes 11 and 12 indicate a user terminal or server or the like, which communicates via the communication system described above.

The controller 31 has functionality equivalent to an OpenFlow controller of Non Patent Literature 1 and 2, and records flow entries (refer to FIG. 9) as control information with regard to the L4SWs 21 to 24. The controller 31 sets a header conversion table as shown in FIG. 5 to FIG. 8, for L7SWs 41 and 42, and controls operation thereof.

The L4SWs 21 to 24 have functionality equivalent to an OpenFlow switch of Non Patent Literature 1 and 2, and perform collation of match conditions of flow entries shown in FIG. 9 with header information of received packets, to search for a flow entry having a match condition that matches the header information of the received packets. As a result of the search, in a case where a flow entry having a match condition matching the header information of a received packet is found, the L4SWs 21 to 24 apply processing content of an action field of the relevant flow entry to the received packet. For example, in a case of receiving a packet with L4 port number=61 from node 11, the L4SW 21 performs an operation of forwarding to the L4SW 22, in accordance with the topmost flow entry in FIG. 9.

On the other hand, as a result of the search, in a case where a flow entry having a match condition matching the header information of a received packet is not found, the L4SWs 21 to 24 send a message (Packet-In) requesting the controller 31 to set a flow entry.

The L7SWs 41 and 42 identify an application running in a connected node from a layer 7 header or the like of a received packet, and refer to the header conversion table shown in FIG. 5 to FIG. 8, to perform an operation of rewriting the L4 header. For example, on receiving a packet of application A from node 11, the L7SW 41 refers to the header conversion table shown in FIG. 5, and performs an operation of rewriting an L4 port number (60-1) of node 11 to 61-1. This type of L7SWs 41 and 42 can be implemented by a server having a function of relaying node communication, such as a proxy server, or a reverse proxy server. A description of specific functions of the L7SWs 41 and 42 is given later, along with operations thereof.

It is to be noted that functions of the abovementioned L7SWs 41 and 42 and the controller 31 may be implemented on a computer configuring these apparatuses, by a computer program that executes the respective processes described above using hardware thereof.

Next, a description is given concerning operations of the first exemplary embodiment of the present disclosure, making reference to the drawings. In the following description it is assumed that traffic of application A and application B starting from node 11 flows between node 11 and node 12 of FIG. 2. There is a possibility of application A and application B being used with the same L4 port number (here, it is assumed that the port number=60) shared, as in KeepAlive in HTTP (HyperText Transfer Protocol) 1.1. Therein, communication of application A is considered to use path 51 of FIG. 3 going through L4 switch 22, and communication of application B is considered to use path 52 going through L4SW 23. A user records the path selection policy in the controller 31. It is to be noted that rather than the user recording the abovementioned paths 51 and 52, the controller 31 may calculate the paths 51 and 52 based on a network policy, a load balancing policy, or the like.

The controller 31 that receives the recording of the path selection policy from the user controls the L7SWs 41 and 42 as follows. First, the controller 31 determines a method of embedding path information in packets transmitted and received by the nodes 11 and 12. The method of embedding the path information is for any field in an L4 header or lower, to which the L2SW 21 to 24 refer. In the present exemplary embodiment, path information is embedded in an L4 port number on the node 11 side. That is, a packet from source node 11 addressed to node 12 embeds path information in a source L4 port number, and a frame from source node 12 addressed to node 11 embeds path information in a destination L4 port number.

Next, the controller 31 determines an L4 port number associated with the path described above. In the present exemplary embodiment, a mapping is determined such that the L4 port number on the node 11 side of a packet flowing in path 51 is L4 port number 61, and the L4 port number on the node 11 side of the frame flowing in path 52 is L4 port number 62. These mapped port numbers are included in match conditions of a flow entry in the L4SWs 21 to 24 as path selection keys. Furthermore, L4 port numbers 61 and 62 mapped to paths 51 and 52 are rewritten to L4 port number 60 by the L7SW 42, and from node 12, L4 port number 60 is shown.

Here, for example, applications A and B use TCP, and at the same time a plurality of TCP sessions can be generated and executed in parallel. In this case, it is necessary to map a plurality of L4 port numbers to the L4 port numbers 61 and 62 in order to distinguish between TCP sessions. Therefore, in the following, reference is made to L4 port number ranges 60, 61, 62.

The L4 port number ranges 61 and 62 must not overlap. The L4 port number range 60 may be the same as the L4 port number ranges 61 and 62. The L4 port number ranges 60, 61 and 62 each have port numbers associated, with the same size. Among the respective L4 port number ranges, an association is made among L4 port numbers 60-1, 61-1 and 62-1.

Figure 3:
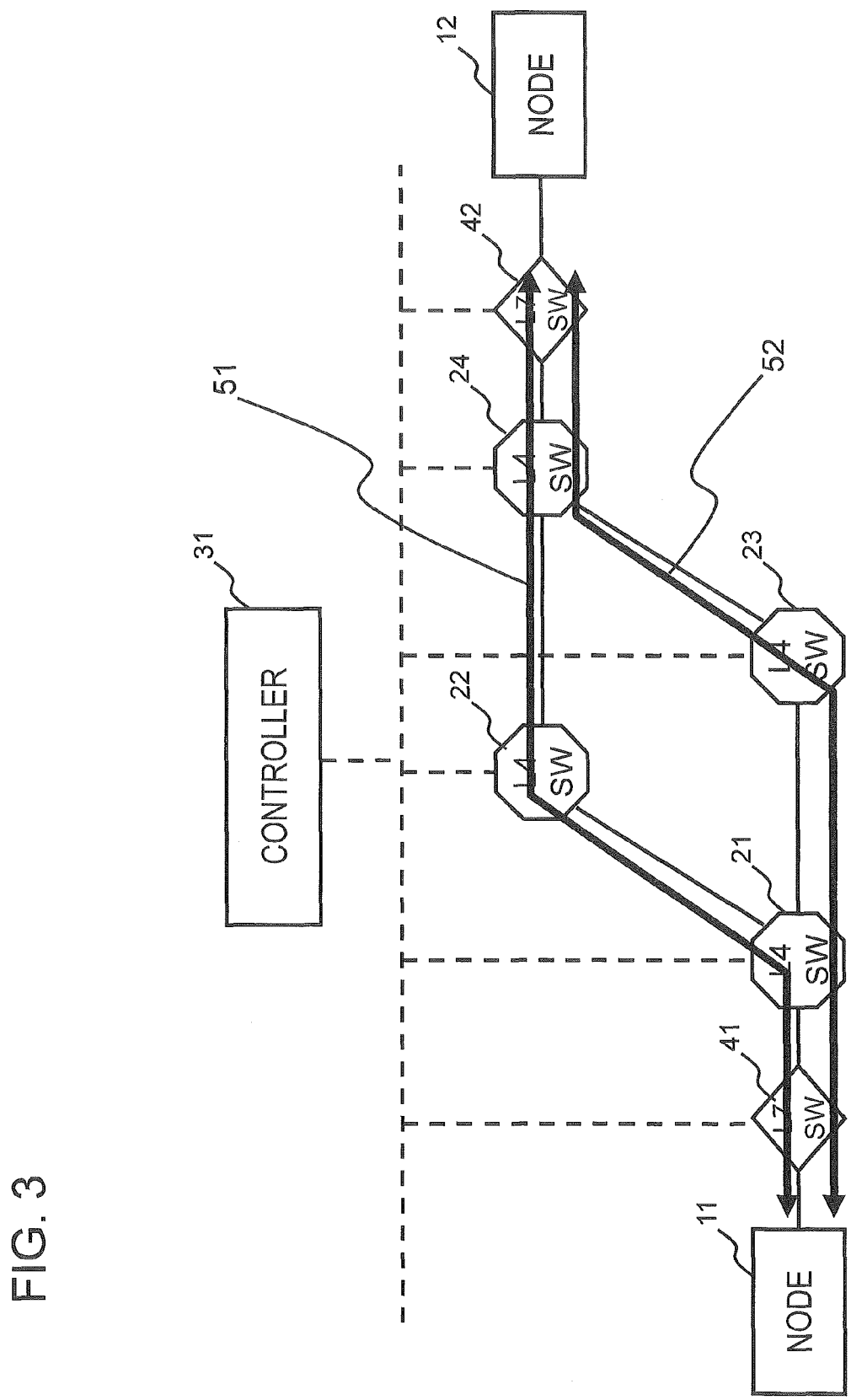
FIG. 3 is an example of a path determined by a controller in the first exemplary embodiment of the present disclosure.

A mapping of the paths used by the above applications and path selection keys is as in FIG. 3, and is held as a path management table in the controller 31.

Next, the controller 31 notifies the L7SW 41 of a method of distinguishing, from packet content, the start of communication of application A and the start of communication of application B. The method of distinguishing the start of communication is based, for example, on information indicated by URL (Uniform Resource Locator) or XML (eXtensible Markup Language) content tag(s) in HTTP protocol. In particular, a method is selected in which distinguishing is possible from communication content of an initial stage of a communication sequence.

Next the controller 31 records the header conversion table shown in FIG. 4, associating communication of application A and the L4 port number range 61 on the node 11 side, and associating communication of application B and the L4 port number range 62 on the node 11 side. The recording in the header conversion table also provides notification to the L4 port number on the node 11 side, that the L4 port number ranges 61 and 62 are not to be used in communication outside of applications A and B. If there is a possibility of the L4 port number ranges 61 and 62 being used by node 11, the L7SW 41 may record an action to convert to another port number. Application of the header conversion table may be limited to communication between node 11 and node 12.

Next, the controller 31 records in the L7SW 42 a method of distinguishing an application from a packet, similar to the L7SW 41. The controller 31 records a header conversion table shown in FIG. 6 associating the L4 port number ranges 61 and 62 and the L4 port number range 60, in the L7SW 42. That is, with regard to the L4 port number ranges 61 and 62 on the node 11 side that have been converted by the L7SW 41, a conversion is performed so that the L4 port number range 60 is seen to be used from node 12.

Next, using L4 port number X, node 11 starts communication of application A addressed to L4 port number Y of node 12.

Packets of application A are first delivered to L7SW 41 by node 11.

Here, in a case where application A uses TCP, since the L7SW 41 cannot distinguish an application until a three-way handshake is completed and L7 data is delivered, it is desirable that the L7SW 41 return a substitute response (SYN-ACID packet) to node 11 instead of node 12. However, in a case of an application in which communication is started from the node 12 side after establishment of a TCP session, the three-way handshake itself may be handled by either application A or B, and delivery made to node 12.

The L7SW 41, on recognizing that communication of application A has started, refers to a header rewrite table shown in FIG. 5, and relays an L4 port number on the node 11 side in place of port number 61-1 selected from the L4 port number range 61.

A packet relayed from the L7SW 41 addressed to node 12 is next delivered to the L4SW 21. The L4SW 21 searches for a flow entry having a match condition corresponding to the packet. At this point in time, since a flow entry having a match condition matching the relevant packet is not set, the L4SW 21 sends a message (Packet-In) requesting setting of a flow entry accompanied by the packet, to the controller 31.

Since a source L4 port number on the node 11 side, among header information included in the message (Packet-In), is within a range of the L4 port number range 61, the controller 31 recognizes that this is a communication of application A. From this recognition result, a flow entry is set for the L4SWs 21, 22 and 24 on path 51, so that the relevant packet flows in path 51. At this time, the L4 port number range 61 is set, as the L4 source port number, in a match condition of a flow entry set in the L4SW 21 forming a path branching point.

FIG. 9 is an example of a flow entry set for the L4SW 21. At this point in time, entry 711 of FIG. 9 is set. It is to be noted that in the abovementioned description, the flow entry is set after waiting for the message (Packet-In) from the L4SW 21, but a flow entry may be set in advance in the L4SWs 21 to 24, at a time of setting the header rewrite table to the L7SWs 41 and 42.

Next, the controller 31 gives an instruction that a packet received from the L4SW 21 be transmitted to the L4SW 24, and transmitted in the direction of the L7SW 42 (Packet-Out message).

The L7SW 42 refers to the header rewrite table shown in FIG. 6, and recognizes that the source L4 port number of the packet forwarded from the L4SW 24 is the L4 port number 61-1, and due to being within the range of the L4 port number range 61, is a communication packet of application A. The L7SW 42 then refers to the header rewrite table shown in FIG. 6 and converts the source L4 port number to the L4 port number 60-1 that is a number corresponding to the L4 port number range 60, to be relayed to node 12.

A packet that is finally delivered to node 12 is seen as being delivered from a port number of the L4 port number range 60 of node 11.

Next, node 12 returns a packet of application A to node 11. A packet of application A from node 12 addressed to node 11 to be delivered to the L7SW 42 has a destination port number of L4 port number 60-1, and is within the range of the L4 port number range 60. The L7SW 42 confirms that this packet is a packet of either of application A or B, in accordance with a method recorded by the controller 31. In a case where it is not possible to distinguish the application, a judgment is made that an application stored during the previous relay is still running.

The L7SW 42 stores the fact that application A was run during the previous relay, judges that communication of application A is still continuing, rewrites an L4 port number that is a destination thereof to a corresponding L4 port number 61-1, and relays in the direction of the L4SW 24.

After delivery to the L7SW 42, similar to packet forwarding in the direction of node 12 from node 11, based on a message (Packet-In) from the L4SW 24, the controller 31 creates a flow entry to cause packet forwarding along path 51 to be set in the L4SWs 24, 22 and 21, on path 51. The controller 31 instructs the L4SW 21 to perform packet forwarding in the direction of the L7SW 41.

From the fact that the destination port number of a received packet is L4 port number 61-1, the L7SW 41 recognizes that communication of application A is continuing. The L7SW 41 refers to the header rewrite table shown in FIG. 5, rewrites the destination L4 port number to port number (X) that node 11 is actually using, and relays to node 11.

Next, it is assumed that node 11 has started communication of application B with the same port number (X). The L7SW 41, when it relays a packet of application B from node 11, recognizes that this is a communication of application B.

The L7SW 41, which recognizes that the L4 port used for application A is being used in application B, updates a field of a running application in the header rewrite table of FIG. 5 to "application B", as shown in FIG. 5.

The L7SW 41 refers to the header rewrite table of FIG. 7, and rewrites an L4 source port number of a packet of application B to port number 62-1 of the L4 port number range 62, and relays in the direction of the L4SW 21. At this time, in a case of using TCP, it is necessary to perform reassignment such that a TCP header sequence number is a number succeeding the previous packet, by only a port number change, rather than re-doing the TCP session.

The L7SW 41 that receives the packet, similar to the case of application A, sends a message (Packet-In) requesting the controller 31 to set a flow entry accompanying the packet. The controller 31 sets a flow entry for application B in the L4SWs 21, 23 and 24 on path 52. In addition, the controller 31 gives an instruction to transmit a packet received from the L4SW 21 to the L4SW 24, and to transmit in the direction of the L7SW 42 (Packet-Out message).

The L7SW 42, similar to the case of application A, recognizes application B from a source L4 port number, and updates a field of a running application in the header rewrite table of FIG. 6 to "application B", as shown in FIG. 8. The L7SW 42 refers to the header rewrite table of FIG. 8, and converts an L4 source port number of a packet of application B to the port number 60-1, and relays to node 12. Here, since the source L4 port number after conversion is port number 60-1, the same as the port number used by application A, node 12 can recognize the communication as being in the same TCP session.

With regard to a packet of application B, in a case where a response packet is transmitted from node 12, the packet is transmitted to node 11 where a header rewrite is performed, similarly to the case of application A.

As described above, according to the present exemplary embodiment, it is possible to perform detailed path control in accordance with an application. Meanwhile, since it is sufficient if a function for distinguishing an application is disposed only at L7SWs at edge(s) of the network, apparatuses configuring a core network can be dedicated to forwarding. That is, a flow entry search function of a switch configuring the core network can be configured by an ASIC (Application Specific Integrated Circuit), so that speeding up can be expected.

In the exemplary embodiment described above, since TCP/IP packets are handled, switches outside of branching points for path selection need not be OpenFlow switches. For example, the L4SWs 22 and 23 can learn MAC addresses to enable replacement by L2 switches that forward packets.

With a node that does not need path control according to application, it is not necessary to restrict L7SWs when connecting to the network. It is possible to connect to the same network a node for which path control according to application is applied and a node for which this is unnecessary.

In the present exemplary embodiment, a flow entry is set for each application. Therefore, by using a flow statistic function of an OpenFlow switch, and counting packets that match a flow entry, usage is also possible in a case such as that of measuring the communication amount of an application.

[Second Exemplary Embodiment]

Figure 10:
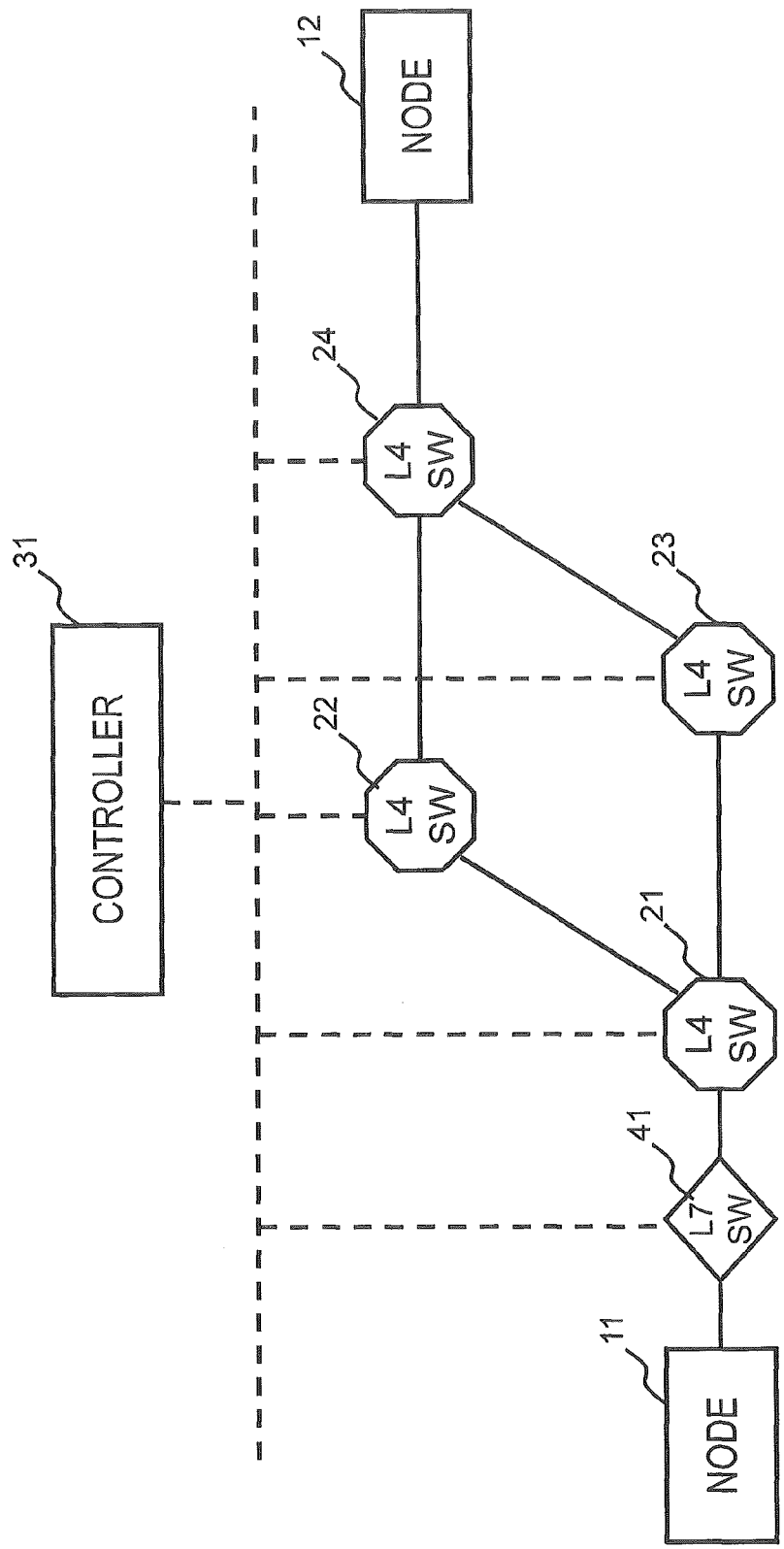
FIG. 10 is a diagram showing a configuration of a communication system in a second exemplary embodiment of the disclosure.
Figure 11:
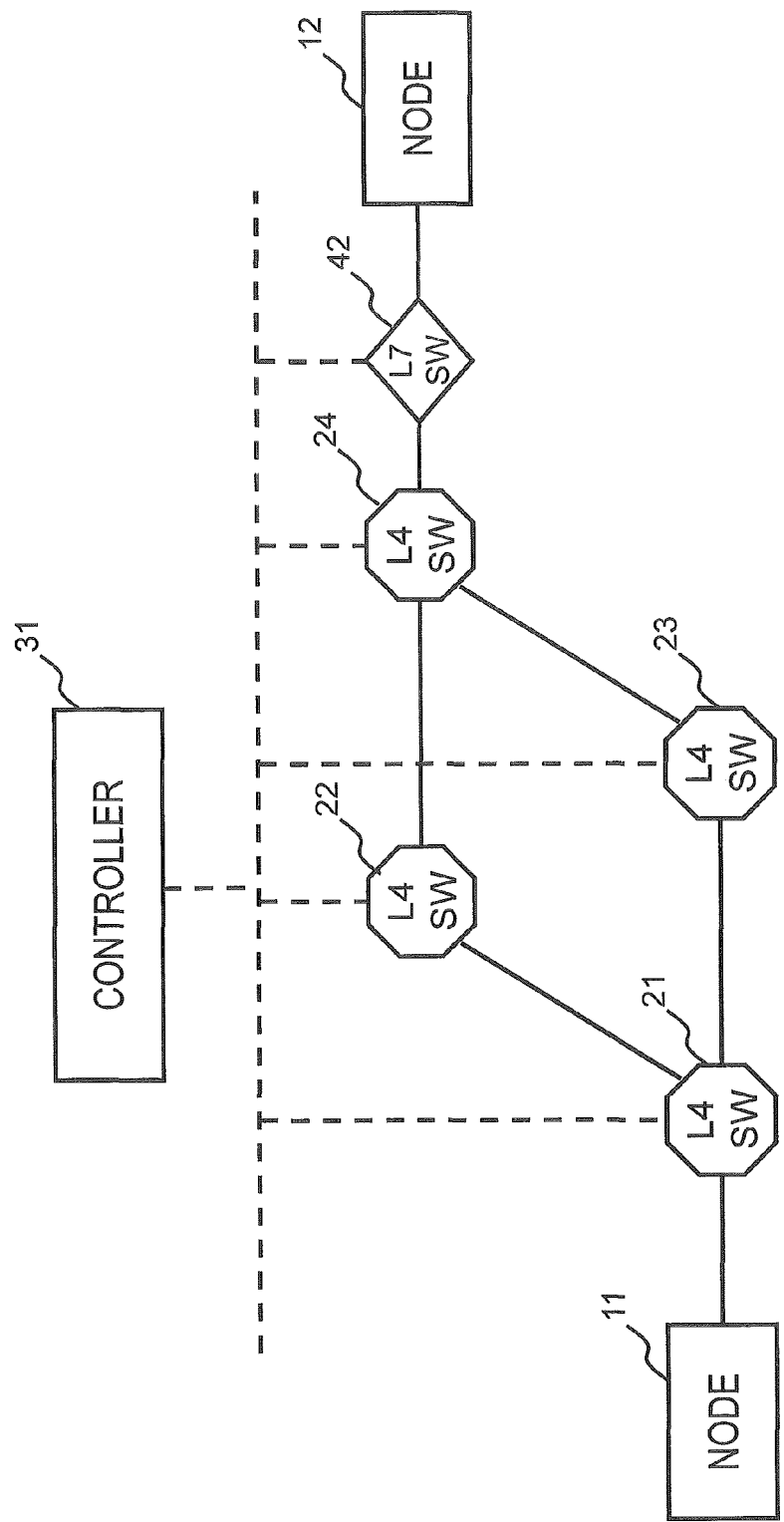
FIG. 11 is a diagram showing a modified configuration of the communication system in the second exemplary embodiment of the disclosure.

Next, a detailed description is given concerning a second exemplary embodiment of the present disclosure, making reference to the drawings, in which an L7SW is disposed, not at two edges of a core network, but at one edge thereof. FIG. 10 and FIG. 11 are diagrams representing configurations of a communication system according to the second exemplary embodiment of the disclosure. A description is given below, centered on points of difference from the first exemplary embodiment.

The present exemplary embodiment can be preferably used in controlling only flow in one direction for an application. FIG. 10 is a diagram representing a configuration of the second exemplary embodiment of the disclosure. FIG. 10 has a configuration in which an L7SW 42 is removed from the configuration of the first exemplary embodiment of FIG. 2, and node 12 is connected to an L4SW 24. FIG. 11 has a configuration in which an L7SW 41 is removed from the configuration of the first exemplary embodiment of FIG. 2, and node 11 is connected to an L4SW 21.

According to the configuration of FIG. 10, path control according to application is possible with regard to a packet from node 11 addressed to node 12. Meanwhile, according to the configuration of FIG. 1, path control according to application is possible with regard to a packet from node 12 addressed to node 11.

A description is given below concerning processing added to a packet from node 11 addressed to node 12 in FIG. 10, and a packet from node 12 addressed to node 11 in FIG. 11.

In both configurations of FIG. 10 and FIG. 11, operations in which an L7SW converts an L4 port number according to an application of a frame delivered from a node, to be sent to an L4SW, are the same. In the first exemplary embodiment, a source L4 port number converted by an L7SW in order to select a path is converted by an opposing L7SW, to be seen as one L4 port number, but in the present exemplary embodiment, since an L7SW is not disposed on an exit side, this must be executed by an L4 switch at an exit of the network. This operation can be realized by setting a flow entry to make an L4SW perform header rewriting. Specifically, in the configuration of FIG. 10, a flow entry is set to make an L4SW 24 perform further header rewriting of an L4 port number of a packet rewritten by an L7SW 41. In the same way, in the configuration of FIG. 11, a flow entry is set similarly to an L4SW 21.

Next, a description is given concerning a packet from node 12 addressed to node 11 in FIG. 10, and concerning a frame from node 11 addressed to 12 in FIG. 11. In the present exemplary embodiment, it is not possible to perform path control according to application for a packet in this direction. It is necessary for a path of the frame in this direction to be determined by a controller 31, and to record a flow entry for delivering as far as the L7SW, in each L4SW.

In the first exemplary embodiment, when a packet is delivered from an L4SW to an L7SW, the L7SW refers to an L4 port number, and a detection is made that there has been a switch of application by an opposing node, but in the present exemplary embodiment this operation is not performed.

It is to be noted that generally it is possible to distinguish an application from the content of a request, but distinguishing an application from a reply is often difficult. For example, in the configuration of FIG. 11, an application is assumed to have a format in which node 11 transmits a request to node 12, and node 12 returns a reply to node 11. The content of a packet delivered from node 12 to the L7SW 42 is a reply, and it is difficult for the L7SW 42 to distinguish an application from this content. With this type of application, a method is effective in which the L7SW 42 distinguishes an application from the content of a packet from node 11 addressed to node 12, and applies a result thereof to path control of a packet from node 12 addressed to node 11.

As described above, even in a configuration where L7SWs are not disposed on two edges of a core network, it is possible to perform path control according to an application with regard to at least communication in one direction.

[Third Exemplary Embodiment]

With regard to a specific application for a configuration similar to the second exemplary embodiment illustrated in FIG. 10, it is possible to perform path control in accordance with the application for communication is both directions. A description is given concerning a third exemplary embodiment of the present disclosure, where it is assumed that communication is performed according to this type of specific application.

Figure 12:
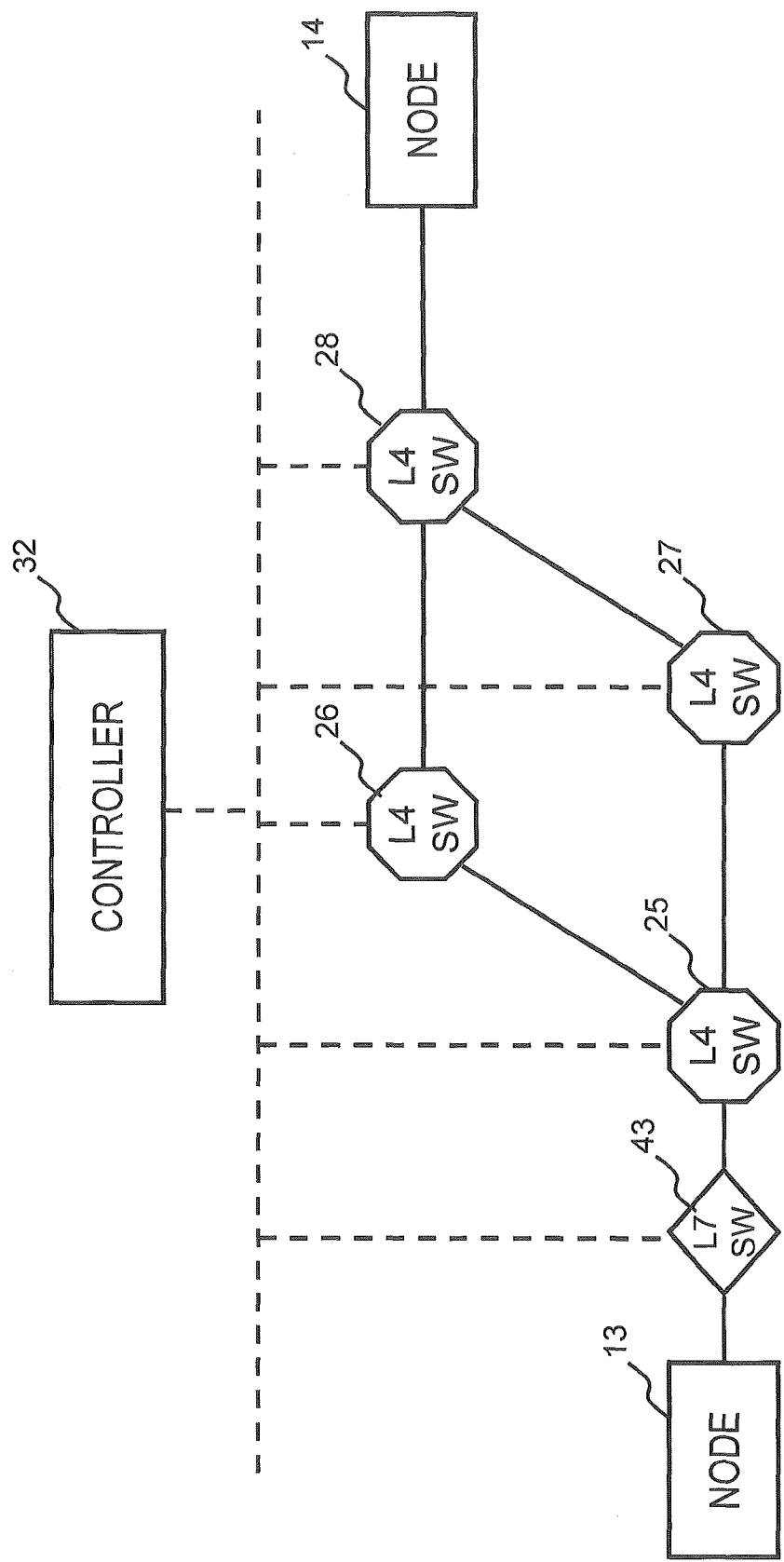
FIG. 12 is a diagram showing a configuration of a communication system in a third exemplary embodiment of the disclosure.

FIG. 12 is a diagram representing a configuration of a communication system according to the third exemplary embodiment of the disclosure. The configuration of FIG. 12 is similar to FIG. 10, but operations of an L7SW 43 are different. Below, with node 13 being an HTTP client and node 14 being an HTTP server, a description is given of the operations.

Figure 13:
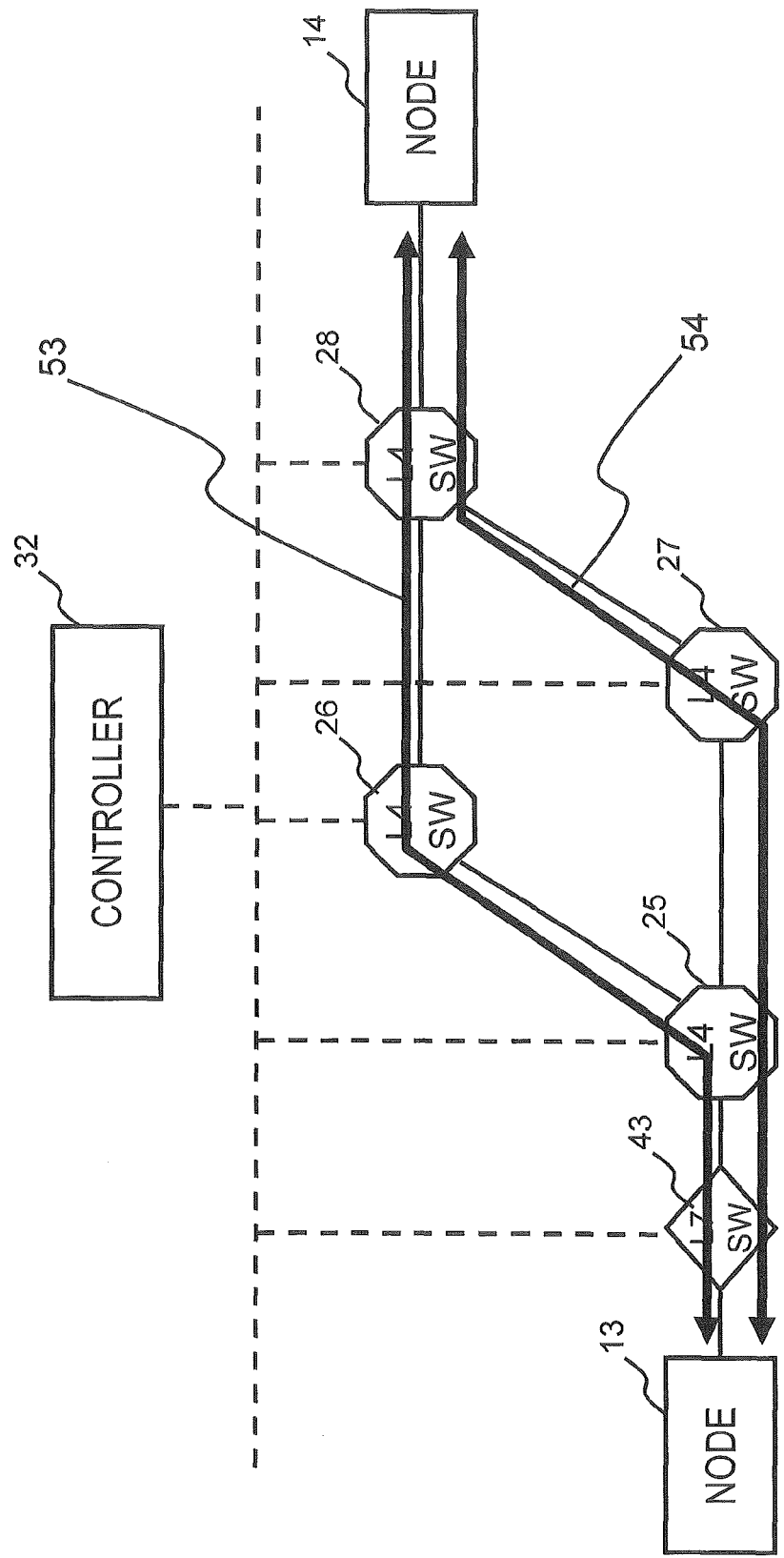
FIG. 13 is an example of a path determined by a controller in the third exemplary embodiment of the disclosure.

Traffic of HTTP application C and HTTP application D is assumed to flow between node 13 and node 14 of a network in FIG. 12. Therein, it is considered that communication of application C uses path of FIG. 13 going through an L4SW 26, and communication of application D uses path 54 of FIG. 13 going through an L4 switch 27. A user records this path selection policy in a controller 32.

The controller 32 that receives the recording of the path selection policy from the user controls an L7SW 43 as follows. First, the controller 32 records a method of distinguishing the start of communication of application C and the start of communication of application D, from the content of a packet to the L7SW 43. In a case of HTTP, it is possible to distinguish an application from the content of a request such as a URL or the like.

As an action when the start of communication of application C or application D is detected, the controller 32 records a header conversion table with attached actions, performing substitute connecting by a source L4 port number in a specific range, in the L7SW 43.

Figure 14:
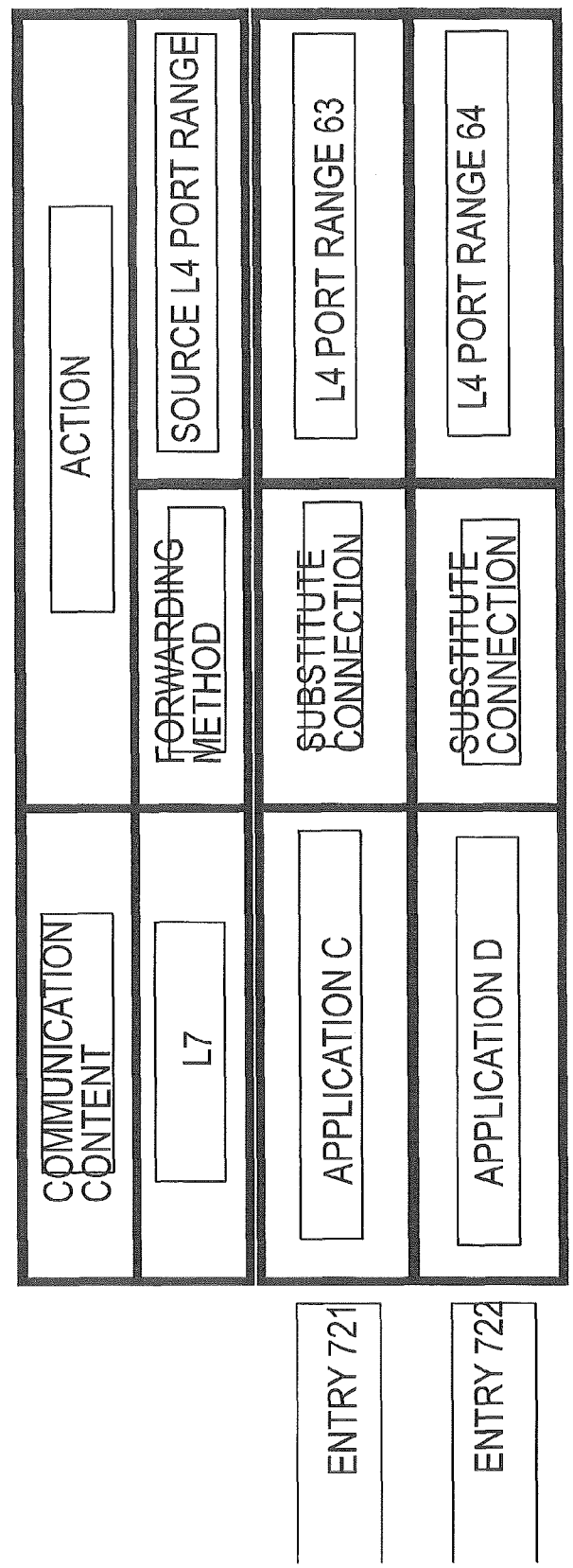
FIG. 14 is an example of a header conversion table held by an L7SW 43 in the third exemplary embodiment of the disclosure.

FIG. 14 is an example of a header conversion table recorded in the L7SW 43. In the example of FIG. 14, a range of the source L4 port number when a substitute connection for application C is made, is L4 port number range 63, and a range of the source L4 port number when a substitute connection for application D is made, is L4 port number range 64. The recording in the header conversion table also provides an instruction to the L7SW 43, that the L4 port number range 63 and the L4 port number range 64 are not to be used as source L4 port numbers in communication outside of with application C and application D.

Next, it is assumed that communication of application C from node 13 to node 14 occurs. A packet transmitted by node 13 first reaches the L7SW 43. The L7SW 43 analyzes the packet, recognizes that node 13 has started communication of application C, and in accordance with entry 721 of FIG. 14, performs a substitute connection to node 14, with source L4 port as L4 port 63-1 selected from the L4 port range 63.

The controller 32 sets a flow entry to make L4SWs 25, 26 and 28 on path 53 forward a packet transmitted by the L7SW 43 that has a substitute connection to node 14, along path 53. In the flow entry, a condition that the L4 port on the L7SW 43 side is within a range of the L4 port range 63 is set as a match condition.

From the above description, a packet of application C transmitted by the L7SW 43 that has a substitute connection to node 14, is forwarded to node 14. Node 14 recognizes a connection from the source L4 port 63-1.

Next, communication of application D from node 13 occurs. Similarly, when the L7SW 43 recognizes communication of application D, in accordance with entry 722 of FIG. 14, a substitute connection is made to node 14 with source L4 port number as L4 port 64-2 selected from the L4 port range 64. This connection is for a session separate from communication of application C.

The controller 32 sets a flow entry that makes the L4SWs 25, 27 and 28 on the path 54 forward a packet transmitted by the L7SW 43 having a substitute connection to node 14, along path 54. In the flow entry, a condition that the L4 port on the L7SW 43 side is within the range of the L4 port range 64 is set as a match condition.

From the above description, a packet of application D transmitted by the L7SW 43 that has a substitute connection to node 14, is forwarded to node 14. Node 14 recognizes a connection from source L4 port 64-2.

A description has been given above of exemplary embodiments of the present disclosure, but the disclosure is not limited to the exemplary embodiments described above, and further modifications, substitutions and adjustments may be added within a scope that does not depart from a fundamental technical concept of the present disclosure. For example, the network configuration illustrated in the respective exemplary embodiments described above is merely a configuration example in order to aid understanding of the present disclosure, and there is no limitation to modes shown in the drawings.

In the abovementioned exemplary embodiments, a description has been given where L4SWs are used as lower layer switches, but other apparatuses that can operate as an OpenFlow switch are also possible.

In the abovementioned exemplary embodiments, a description has been given citing examples of rewriting an L4 port number, but operations of rewriting a MAC address, an IP address or the like are also possible. It is also possible to use a method of assigning an identifier by which flow can be identified in a suitable area of a packet header.

Finally, preferable modes of the present disclosure are summarized.

[Mode 1]

(Refer to the communication system according to the first aspect described above)

[Mode 2]

The communication system according to Mode 1, further including a second upper layer switch, disposed at another edge of the core network, which rewrites the header region of the lower layer rewritten by the upper layer switch, to prescribed content indicating a transmission source.

[Mode 3]

The communication system according to Mode 2, wherein the second upper layer switch performs an operation of rewriting, with regard to a packet received from an opposite direction based on an instruction from the control apparatus, a prescribed region of a header of the lower layer of the packet, with content associated with communication content of the upper layer, and the upper layer switch restores the header region of the lower layer rewritten by the second upper layer switch.

[Mode 4]

The communication system according to any one of Modes 1 to 3, wherein the upper layer switch, on detecting an occurrence of a specific communication with an external node, makes a substitute connection to the lower layer switch, and the control apparatus sets control information holding a match condition to distinguish a packet from the upper layer switch for which the substitute connection has been made.

[Mode 5]

The communication system according to any one of Modes 1 to 4, wherein the upper layer switch or the second upper layer switch performs rewriting of a lower layer header, based on a header rewrite table set by the control apparatus.

[Mode 6]

The communication system according to any one of Modes 1 to 5, wherein the upper layer switch is a layer 7 switch that distinguishes application(s), and the control apparatus performs path control in accordance with application type.

[Mode 7]

The communication system according to any one of Modes 1 to 6, wherein the upper layer switch is a layer 7 switch that distinguishes application(s), and the control apparatus instructs the upper layer switch or the second upper layer switch to convert a layer 4 port number of a received packet to a number range associated with application type.

[Mode 8]

The communication system according to any one of Modes 1 to 7, wherein the lower layer switch is an OpenFlow switch, and the control apparatus is an OpenFlow controller that sets a flow entry that includes a layer 4 port number range in a match condition, as the control information.

[Mode 9]

(Refer to the upper layer switch according to the second aspect described above)

[Mode 10]

(Refer to the control apparatus according to the third aspect described above)

[Mode 11]

(Refer to the switch control method according to the fourth aspect described above)

[Mode 12]

(Refer to the program according to the fifth aspect described above) Note that the abovementioned Modes 9 to 12 may be developed to Modes 2 to 8, similarly to Mode 1.

It is to be noted that that each disclosure of the abovementioned patent literature and non-patent literature is incorporated herein by reference thereto. Modifications and adjustments of exemplary embodiments and examples are possible within the bounds of the entire disclosure (including the scope of the claims) of the present invention and also based on fundamental technological concepts thereof. Furthermore, a wide variety of combinations and selections of various disclosed elements (including respective elements of respective claims, respective elements of respective exemplary embodiments and examples, and respective elements of respective drawings) is possible within the scope of the claims of the present invention. That is, the present invention clearly includes every type of transformation and modification that a person skilled in the art can realize according to the entire disclosure including the scope of the claims and to technological concepts thereof. It is to be noted that terms herein described in the singular form, necessarily also represent plurals. It is to be noted that in the Japanese language, terms are described in forms that are the same in both singular and plural.

11 to 14, 11A, 12A node
21 to 28 layer 4 switch (L4SW)
21A to 24A lower layer switch (LLSW)
31, 32 controller
31A control apparatus
41 to 43 layer 7 switch (L7SW)
41A, 42A upper layer switch (ULSW)
51 to 54 path
711 to 714 flow entry
721, 722 entry

The invention claimed is:

1. A communication system, comprising:
a core network comparing a lower layer switch that holds control information associating at least one match condition including lower layer header information, and processing content, and processes a received packet using control information having a match condition that matches the received packet;
a first upper layer switch, disposed at a first edge of said core network, which rewrites a prescribed region of a header of a lower layer of a packet with content associated with communication content of an upper layer, wherein said first upper layer switch comprises a layer 7 switch that distinguishes at least one application;
a second upper layer switch, disposed at a second edge of said core network, which rewrites the prescribed region of the header of the lower layer rewritten by said first upper layer switch, to prescribed content indicating a transmission source; and
a control apparatus that instructs said first upper layer switch to rewrite the prescribed region of the header of said lower layer, sets control information including, in a match condition, header information after said rewriting, in said lower layer switch, and instructs one of said first upper layer switch and said second upper layer switch to convert a layer 4 port number of the received packet to a number range associated with an application type.

2. The communication system according to claim 1, wherein
the second upper layer switch performs an operation of rewriting, with regard to a packet received from an opposite direction based on an instruction from said control apparatus, a prescribed region of a header of the lower layer of said packet, with content associated with communication content of said upper layer, and
the first upper layer switch restores the prescribed region of the header of said lower layer rewritten by said second upper layer switch.

3. The communication system according to claim 1, wherein the first upper layer switch, on detecting an occurrence of a specific communication with an external node, makes a substitute connection to said lower layer switch, and the control apparatus sets control information holding a match condition to distinguish a packet from said first upper layer switch for which said substitute connection has been made.

4. The communication system according to claim 1, wherein one of said first upper layer switch and said second upper layer switch performs rewriting of a lower layer header, based on a header rewrite table set by said control apparatus.

5. The communication system according to claim 1, wherein said control apparatus performs path control in accordance with an application type.

6. The communication system according to claim 1, wherein the lower layer switch comprises an OpenFlow switch, and the control apparatus comprises an OpenFlow controller that sets a flow entry including a layer 4 port number range in a match condition, as said control information.

7. A switch control method for a network, the network comprising:
- a core network that comprises a lower layer switch that holds control information associating at least one match condition including lower layer header information, and processing content, and processes a received packet using control information having a match condition that matches the received packet;
- a first upper layer switch, disposed at a first edge of said core network, which rewrites a prescribed region of a header of a lower layer of a packet with content associated with communication content of an upper layer; and
- a second upper layer switch, disposed at a second edge of said core network, which rewrites the prescribed region of the header of said lower layer rewritten by said first upper layer switch, to prescribed content indicating a transmission source;

the method comprising:
- instructing said first upper layer switch to rewrite the prescribed region of the header of said lower layer,
- setting control information including, in a match condition, header information after said rewriting, in said lower layer switch, and
- converting a layer 4 port number of the received packet to a number range associated with an application type.

8. The communication system according to claim 1, wherein
the first upper layer switch, on detecting an occurrence of a specific communication with an external node, makes a substitute connection to said lower layer switch, and
the control apparatus sets control information holding a match condition to distinguish a packet from said first upper layer switch for which said substitute connection has been made.

9. The communication system according to claim 2, wherein
the first upper layer switch, on detecting an occurrence of a specific communication with an external node, makes a substitute connection to said lower layer switch, and
the control apparatus sets control information holding a match condition to distinguish a packet from said first upper layer switch for which said substitute connection has been made.

10. The communication system according to claim 1, wherein one of said first upper layer switch and the said second upper layer switch performs rewriting of a lower layer header, based on a header rewrite table set by said control apparatus.

11. The communication system according to claim 3, wherein one of said first upper layer switch and said second upper layer switch performs rewriting of a lower layer header, based on a header rewrite table set by said control apparatus.

12. The communication system according to claim 1, wherein said control apparatus performs path control in accordance with the application type.

13. The communication system according to claim 2, wherein said control apparatus performs path control in accordance with the application type.

14. The communication system according to claim 3, wherein said control apparatus performs path control in accordance with the application type.

15. The communication system according to claim 4, wherein said control apparatus performs path control in accordance with the application type.

* * * * *

UNITED STATES PATENT AND TRADEMARK OFFICE
CERTIFICATE OF CORRECTION

| | | |
|---|---|---|
| PATENT NO. | : 9,515,926 B2 | Page 1 of 1 |
| APPLICATION NO. | : 14/388206 | |
| DATED | : December 6, 2016 | |
| INVENTOR(S) | : Takeshi Kato | |

It is certified that error appears in the above-identified patent and that said Letters Patent is hereby corrected as shown below:

In the Specification

Column 4, Line 1: After "OF", insert --THE--

Column 7, Line 61: Delete "(SYN-ACID packet)" and insert --(SYN-ACK packet)--

Column 11, Line 37: After "path", insert --53--

In the Claims

Column 14, Line 25: In Claim 1, delete "comparing" and insert --comprising--

Signed and Sealed this
Fifth Day of September, 2017

Joseph Matal
*Performing the Functions and Duties of the*
*Under Secretary of Commerce for Intellectual Property and*
*Director of the United States Patent and Trademark Office*